(12) United States Patent
Takeshita et al.

(10) Patent No.: US 10,848,262 B2
(45) Date of Patent: Nov. 24, 2020

(54) OPTICAL PATH DESIGN APPARATUS AND OPTICAL PATH DESIGN METHOD

(71) Applicant: NEC Corporation, Tokyo (JP)

(72) Inventors: Hitoshi Takeshita, Tokyo (JP); Shinsuke Fujisawa, Tokyo (JP); Akio Tajima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/336,160

(22) PCT Filed: Sep. 20, 2017

(86) PCT No.: PCT/JP2017/033815
§ 371 (c)(1),
(2) Date: Mar. 25, 2019

(87) PCT Pub. No.: WO2018/056285
PCT Pub. Date: Mar. 29, 2018

(65) Prior Publication Data
US 2019/0260474 A1    Aug. 22, 2019

(30) Foreign Application Priority Data

Sep. 26, 2016  (JP) .................................. 2016-186852

(51) Int. Cl.
*H04J 14/02* (2006.01)
(52) U.S. Cl.
CPC .............................. *H04J 14/0267* (2013.01)
(58) Field of Classification Search
CPC ..................................... H04J 14/0267–0271
See application file for complete search history.

(56) References Cited

U.S. PATENT DOCUMENTS 5,392,286 A * 2/1995 Tanaka ............... H04Q 11/0478
370/231
2002/0197001 A1   12/2002 Hayashi et al.
(Continued)

FOREIGN PATENT DOCUMENTS

JP        2003-009194 A      1/2003
JP        2008-245225 A     10/2008
(Continued)

OTHER PUBLICATIONS

Written Opinion of the International Searching Authority of PCT/JP2017/033815 dated Dec. 19, 2017.
(Continued)

*Primary Examiner* — Casey L Kretzer
(74) *Attorney, Agent, or Firm* — Sughrue Mion, PLLC

(57) ABSTRACT

In an optical communication network using the wavelength division multiplexing system, the accommodation efficiency for the optical paths decreases, and it becomes difficult to use the optical communication network efficiently, if the optical frequency slots are used concentrically in a specific optical fiber; therefore, an optical path design apparatus according to an exemplary aspect of the present invention includes route candidate selection means for searching for a route of an optical path to accommodate a communication demand and selecting a plurality of route candidates; optical path candidate selection means for selecting a plurality of optical path candidates by allocating an optical frequency band required to accommodate the optical path to each of optical fibers on the plurality of route candidates; and optical path determination means for determining the optical path from among the plurality of optical path candidates based on an optical frequency band utilization rate in the optical fibers.

14 Claims, 14 Drawing Sheets

(56) References Cited

U.S. PATENT DOCUMENTS

| | | | |
|---|---|---|---|
| 2011/0205898 A1 | 8/2011 | Ichiki et al. | |
| 2012/0301141 A1* | 11/2012 | Sakamoto | H04J 14/0204 398/48 |
| 2013/0216226 A1* | 8/2013 | Hirano | H04J 14/0267 398/51 |
| 2014/0099119 A1* | 4/2014 | Wei | H04J 14/0257 398/79 |
| 2015/0163009 A1* | 6/2015 | Fu | H04J 14/0257 398/48 |
| 2016/0164781 A1 | 6/2016 | Imai et al. | |
| 2017/0302370 A1 | 10/2017 | Fujisawa et al. | |

FOREIGN PATENT DOCUMENTS

| | | |
|---|---|---|
| JP | 2011-176631 A | 9/2011 |
| JP | 2016-111599 A | 6/2016 |
| WO | 2012/057095 A1 | 5/2012 |
| WO | 2016/047101 A1 | 3/2016 |

OTHER PUBLICATIONS

International Search Report of PCT/JP2017/033815 dated Dec. 19, 2017.

* cited by examiner

OPTICAL PATH DESIGN APPARATUS AND OPTICAL PATH DESIGN METHOD

CROSS REFERENCE TO RELATED APPLICATIONS

This application is a National Stage of International Application No. PCT/JP2017/033815 filed Sep. 20, 2017, claiming priority based on Japanese Patent Application No. 2016-186852 filed Sep. 26, 2016, the disclosure of which are incorporated herein in their entirety by reference.

TECHNICAL FIELD

The present invention relates to optical path design apparatuses and optical path design methods and, in particular, to an optical path design apparatus and an optical path design method that are used in an optical communication network according to a wavelength division multiplexing system.

BACKGROUND ART

A communication capacity in a core network is required to be expanded due to explosive spread of mobile terminals, rapid expansion of high-definition video distribution services, and the like. Such a requirement to expand the capacity tends to continue in the future. In order to continuously expand the communication capacity at limited cost, it is effective to increase utilization efficiency of the network by efficiently operating resources of the network.

Particularly, in an optical communication network in which an information capacity to be handled is extremely large, it is important to efficiently use an optical frequency band of communication resources. When the optical frequency band is used in the optical communication network, it is necessary to consider a quality degradation of an optical signal that is caused by restrictions due to a variety of physical laws in optical signal transmission. The physical restrictions in this case include, for example, a crosstalk between adjacent wavelength channels in wavelength multiplexing optical signal transmission, a degradation of an optical signal/noise (S/N) ratio that is caused by an optical fiber loss or an optical noise added by an optical amplifier, and the like. In addition, a passband narrowing effect caused by passing through a plurality of optical band pass filters (BPFs) is also included in the above-mentioned physical restrictions.

In the optical communication network, as a transmission distance of the optical signal from a communication source to a communication destination, that is, an optical path length is shorter, communication with better quality becomes possible because of a small effect of the physical restrictions as described above. Hence, when there are a plurality of options in a route from the communication source to the communication destination, a shortest route is selected. The Dijkstra's algorithm is often used for searching for the shortest route. An optical frequency band is allocated on the selected shortest route.

Meanwhile, an optical communication network utilizing a flexible grid (a flexible optical network) can raise optical frequency utilization efficiency, even though a communication capacity is unchanged, by increasing or decreasing a required optical frequency band depending on a transmission distance. This is an excellent feature in comparison with a fixed grid that has been conventionally used. The required optical frequency band requires a wider band as the transmission distance becomes longer; accordingly, a shorter transmission distance has more advantage in the optical frequency utilization efficiency.

Patent Literature 1 discloses an example of a frequency/route determination apparatus to allocate a frequency with a variable width in the above-described flexible optical network. The route/frequency determination apparatus in Patent Literature 1 includes a resource information DB, a common free frequency information generation unit, a frequency state evaluation unit, a frequency/route determination unit, and a communication route demand distribution DB.

The common free frequency information generation unit obtains resource information of a plurality of fibers that are calculation targets from the resource information DB, and generates free frequency information common to the obtained fibers. The frequency state evaluation unit provides an evaluation value in consideration of consecutiveness of free frequency on free resource information, and in consideration of distribution of assumed communication routes for the assumed communication route setting request.

The frequency/route determination unit calculates a candidate route and a frequency that becomes an assignment candidate. The frequency/route determination unit calculates a metric based on the evaluation value given by the frequency state evaluation unit, the metric being a value for calculating a determined candidate from a plurality of candidates of combinations of candidate routes and assigned frequency. The frequency/route determination unit calculates an optimum route and assigning frequency based on the calculated metric.

It is said that those configurations make it possible to effectively suppress occurrence of fragmentation in the flexible optical network, and to optimize utilization efficiency of frequency resources.

CITATION LIST

Patent Literature

PTL 1: WO 2012/057095

SUMMARY OF INVENTION

Technical Problem

In optical path design in an optical communication network, it is important to search for many optical paths under the condition that communication resources are constant. In case of failure to search for an optical path to a desired communication demand, it is necessary to additionally provide communication resources such as optical fibers and transponders in order to open the optical path. However, it is undesirable to provide the communication resources additionally because an additional cost is generated. Consequently, it is important to perform optical path design to succeed in searching for many optical paths without providing the communication resource additionally. That is to say, accommodation efficiency for optical paths increases as the number of optical paths succeeding in the search becomes larger; accordingly, it becomes possible to utilize the optical communication network efficiently.

As mentioned above, Patent Literature 1 discloses the route/frequency determination apparatus that makes it possible to effectively suppress the occurrence of fragmentation of optical frequency slots and maximize the utilization efficiency of optical frequency resources. However, if the occurrence of the fragmentation of optical frequency slots is suppressed, the optical frequency slots are used concentrically in a specific optical fiber; accordingly, it becomes difficult to set an optical path passing through the specific optical fiber. As a result, the accommodation efficiency for the optical paths decreases, and efficient use of the optical communication network is prevented.

As described above, there has been the problem that, in an optical communication network using the wavelength division multiplexing system, the accommodation efficiency for the optical paths decreases, and it becomes difficult to use the optical communication network efficiently, if the optical frequency slots are used concentrically in a specific optical fiber.

The object of the present invention is to provide an optical path design apparatus and an optical path design method that solve the above-mentioned problem that, in an optical communication network using the wavelength division multiplexing system, the accommodation efficiency for the optical paths decreases, and it becomes difficult to use the optical communication network efficiently, if the optical frequency slots are used concentrically in a specific optical fiber.

Solution to Problem

An optical path design apparatus according to an exemplary aspect of the present invention includes route candidate selection means for searching for a route of an optical path to accommodate a communication demand and selecting a plurality of route candidates; optical path candidate selection means for selecting a plurality of optical path candidates by allocating an optical frequency band required to accommodate the optical path to each of optical fibers on the plurality of route candidates; and optical path determination means for determining the optical path from among the plurality of optical path candidates based on an optical frequency band utilization rate in the optical fibers.

An optical path design method according to an exemplary aspect of the present invention includes searching for a route of an optical path to accommodate a communication demand and selecting a plurality of route candidates; selecting a plurality of optical path candidates by allocating an optical frequency band required to accommodate the optical path to each of optical fibers on the plurality of route candidates; and determining the optical path from among the plurality of optical path candidates based on an optical frequency band utilization rate in the optical fibers.

Advantageous Effects of Invention

According to an optical path design apparatus and an optical path design method of the present invention, it becomes possible, in an optical communication network using a wavelength division multiplexing system, to increase the accommodation efficiency for optical paths and to use the optical communication network efficiently.

EXAMPLE EMBODIMENT

Example embodiments of the present invention will be described below with reference to the drawings.

First Example Embodiment

Figure 1:
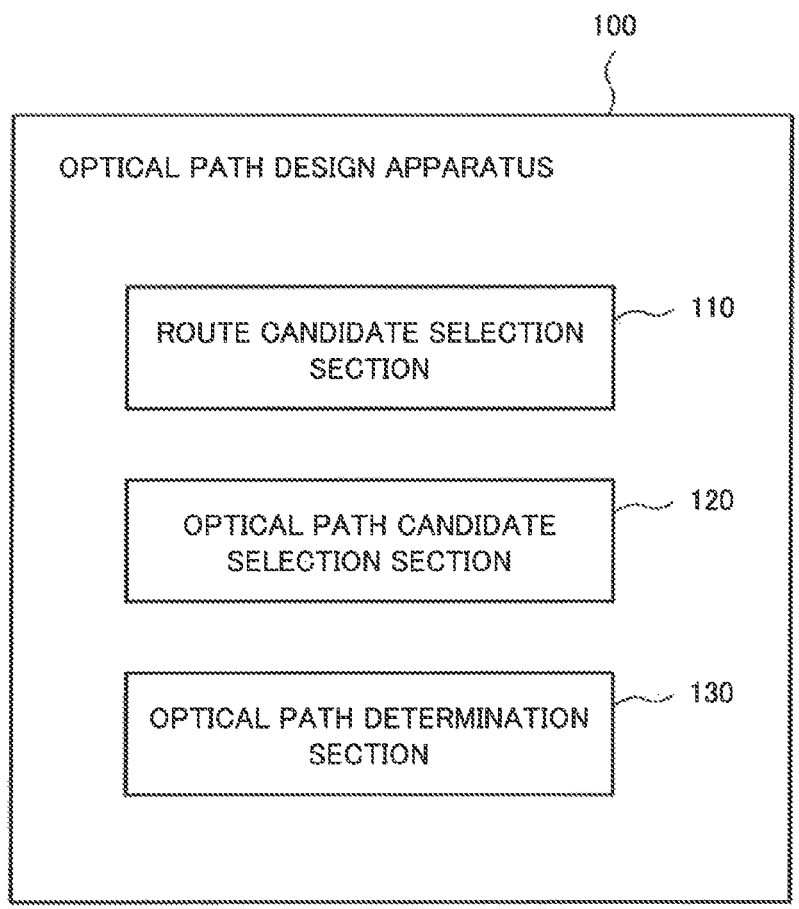
FIG. 1 is a block diagram illustrating a configuration of an optical path design apparatus according to a first example embodiment of the present invention.

FIG. 1 is a block diagram illustrating a configuration of an optical path design apparatus 100 according to a first example embodiment of the present invention.

The optical path design apparatus 100 includes a route candidate selection section (route candidate selection means) 110, an optical path candidate selection section (optical path candidate selection means) 120, and an optical path determination section (optical path determination means) 130.

The route candidate selection section 110 searches for a route of an optical path to accommodate a communication demand, and selects a plurality of route candidates. The optical path candidate selection section 120 selects a plurality of optical path candidates by allocating an optical frequency band required to accommodate the optical path to each of optical fibers on the plurality of route candidates. The optical path determination section 130 determines the optical path to accommodate the communication demand from among the plurality of optical path candidates based on an optical frequency band utilization rate in the optical fibers.

As described above, the optical path design apparatus 100 according to the present example embodiment is configured to determine an optical path, from among a plurality of optical path candidates differing from each other in a route, based on the optical frequency band utilization rate in the optical fiber on the route. This makes it possible to prevent a decrease in the accommodation efficiency for optical paths that is caused by selecting a route in which there is no unused optical frequency band. As a result, according to the optical path design apparatus 100 of the present example embodiment, it becomes possible, in an optical communication network using a wavelength division multiplexing system, to increase the accommodation efficiency for the optical paths and to use the optical communication network efficiently.

The route candidate selection section 110 can be configured to select the plurality of route candidates based on optical transmission performance using the optical fiber on the route. In other words, the route candidate selection section 110 can be configured to determine whether or not an optical signal is reachable based on the optical transmission performance and to select, as a route candidate, only the route that is determined to be reachable. Here, the optical transmission performance includes at least one of an optical signal-to-noise ratio, a nonlinear effect of optical fibers, a crosstalk between adjacent wavelength channels, and a passband narrowing effect due to an optical band pass filter.

The optical path determination section 130 can be configured to determine, as the optical path to accommodate the communication demand, an optical path candidate with minimum optical frequency band utilization rate in a maximum accommodation optical fiber in which an optical frequency band utilization rate is maximum among the optical fibers on the route. The optical frequency band utilization rate can be calculated by using at least one of the number of optical frequency slots, the number of optical paths, and the number of optical frequency slots that are continuously arranged.

Figure 2:
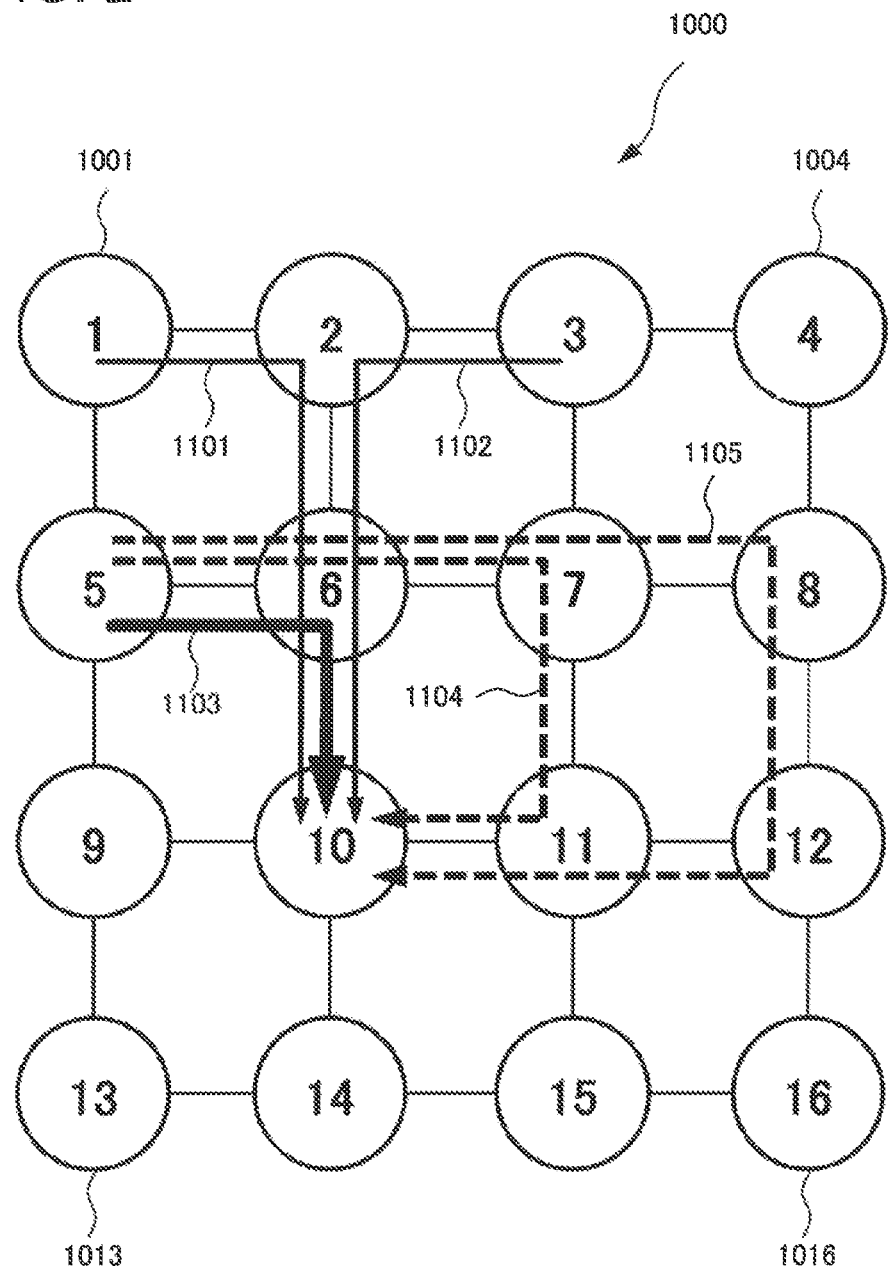
FIG. 2 is a diagram schematically illustrating a configuration of an optical communication network to explain the operation of the optical path design apparatus according to the first example embodiment of the present invention.

Next, the operation of the optical path design apparatus 100 according to the present example embodiment will be described in detail. Hereinafter, the operation will be described by taking, as an example, an optical communication network 1000 composed of 16 nodes illustrated in FIG. 2. In FIG. 2, respective circles represent respective optical nodes 1001 to 1016. The respective optical nodes 1001 to 1016 are connected to one another by optical fibers composed of twelve optical fibers 1201 to 1212 that connect the respective optical nodes to one another in a lateral direction in FIG. 2 and twelve optical fibers 1301 to 1312 that connect the respective optical nodes to one another in a longitudinal direction in FIG. 2.

Figure 3:
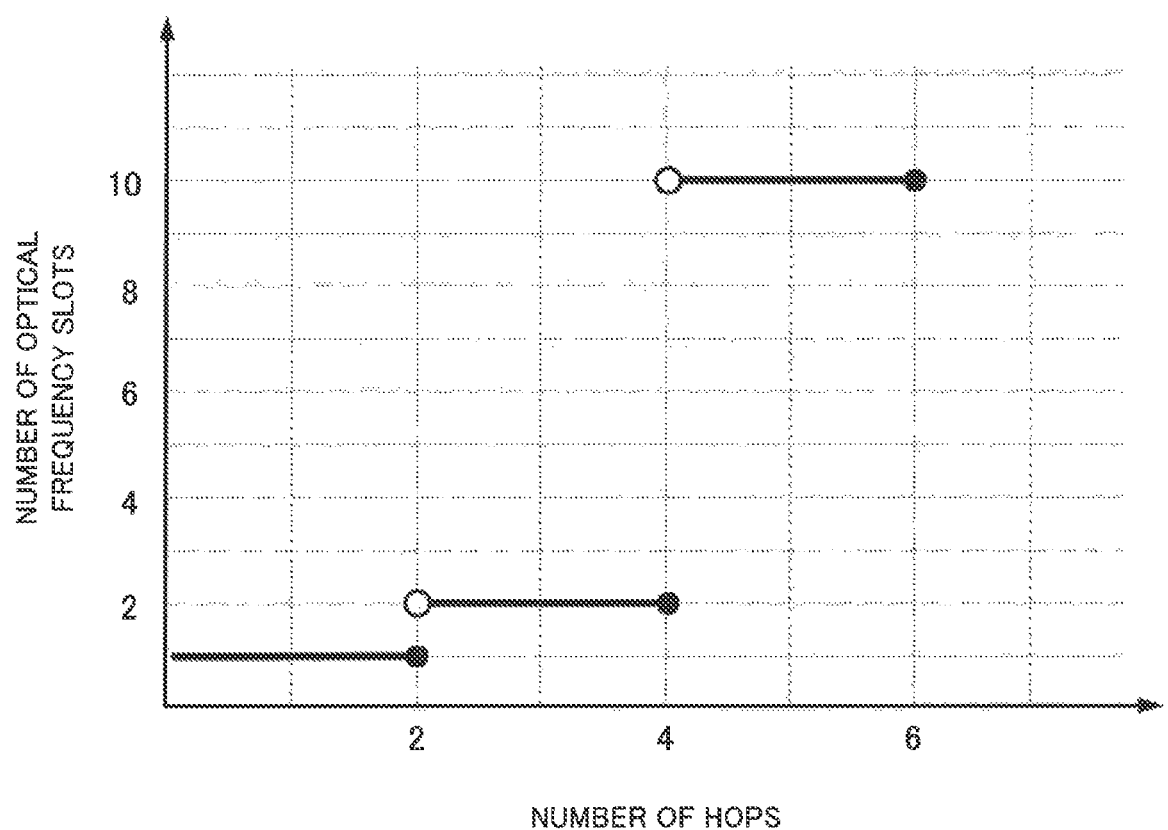
FIG. 3 is a diagram illustrating reachability of an optical signal in the optical communication network according to the first example embodiment of the present invention.

As illustrated in FIG. 2, an optical path 1101 and an optical path 1102 are set in the optical communication network 1000. The optical path 1101 accommodates a communication demand ranging from the optical node 1001 to the optical node 1010. The optical path 1102 accommodates a demand ranging from the optical node 1003 to the optical node 1010. It is assumed that relationships illustrated in FIG. 3 are known in advance about the reachability of an optical signal, with regard to the optical communication network 1000. Here, in the optical communication network 1000, each distance between all optical nodes is set to be equal. Consequently, a length of an optical path connecting the optical node to one another, that is, a distance over which the optical signal should reach, is proportional to the number of hops between the optical nodes. Because the optical communication network 1000 is a flexible optical network utilizing a flexible grid, the optical frequency band is allocated to the optical path by the optical frequency slot with 12.5 GHz serving as a unit, for example. FIG. 3 illustrates a relationship, where the optical signal reaches throughout desired number of hops, between the number of hops and the number of optical frequency slots needed for that case. That is to say, FIG. 3 shows a necessary optical frequency band for the optical signal to reach to a desired distance.

For example, when the number of hops in the optical path is two, FIG. 3 shows that the required number of optical frequency slots is one. When the number of hops exceeds six, FIG. 3 shows that it is impossible for the optical signal to reach due to restrictions of the performance of a transponder that transmits and receives the optical signal, even though the number of optical frequency slots is made larger than ten. Each of the optical fibers 1201 to 1212 and 1301 to 1312 is assumed to have a capacity enough to accommodate six optical frequency slots.

Figure 4:
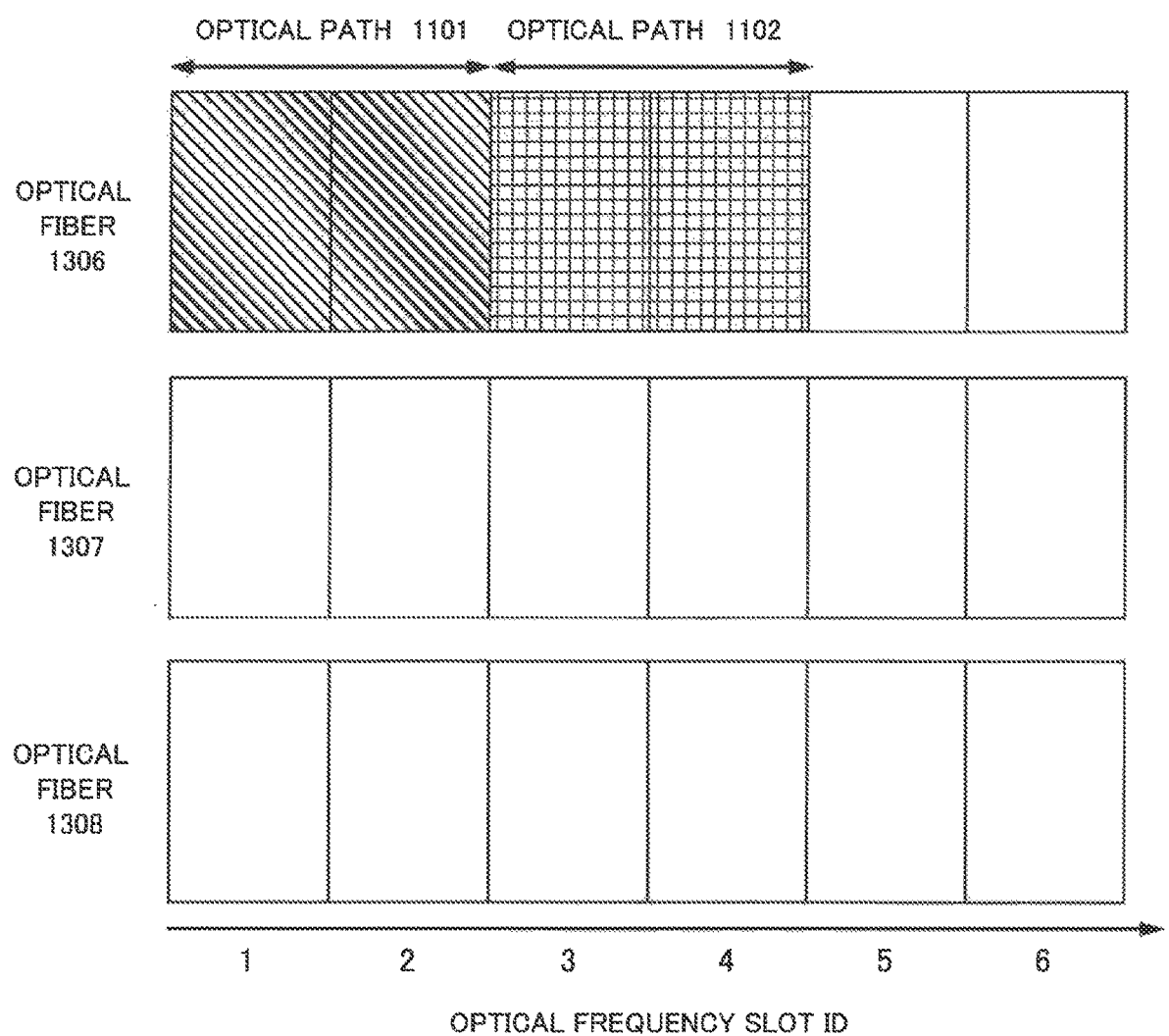
FIG. 4 is a diagram illustrating utilization situations of optical frequency slots in respective optical fibers in the optical communication network according to the first example embodiment of the present invention.

FIG. 4 illustrates utilization situations of the optical frequency slots in the optical fibers 1306, 1307 and 1308 in situations where the optical path 1101 and the optical path 1102 are set as illustrated in FIG. 2.

In this case, a utilization rate $\eta$ of the optical frequency slots in the optical fiber 1306 can be calculated as $4/6 = 0.67$. When utilization rates of the optical frequency slots in the other optical fibers 1307 and 1308 are calculated in the same manner, both calculated results become 0. Accordingly, it is in the optical fiber 1306 that an optical frequency slot utilization rate is maximized, in the optical path setting situations of the optical communication network 1000 illustrated in FIG. 2. The optical frequency slot utilization rate $\eta$ in this time becomes $4/6$.

A case will be described where a demand from the optical node 1005 to the optical node 1010 newly occurs. It is assumed that the setting of an optical path passing through the optical node 1009 is inhibited. First, a search for the optical path based on a related method will be described as a comparative example. In the related method, a route is searched for in which a route length from the optical node 1005 to the optical node 1010 becomes shortest. Accordingly, an optical path 1103 is obtained in which the number of hops is two (see FIG. 2). FIG. 3 shows that the number of required optical frequency slots is one when the number of hops is two. Consequently, the utilization situations of the optical frequency slots in this case become those illustrated in FIG. 5. As is the case with those illustrated in FIG. 4, an optical frequency slot utilization rate $\eta$ in the optical fiber in which the optical frequency slot utilization rate becomes maximum (optical fiber 1306) is calculated to be $5/6$.

Next, a search for an optical path according to the optical path design apparatus 100 of the present example embodiment will be described in detail. The optical path design apparatus 100 according to the present example embodiment sets priority for each of the route length and the optical frequency slot utilization rate. A decision based on the optical frequency slot utilization rate has priority over a decision based on the route length. Here, a case will be described with reference to FIG. 6 where higher priority is set to the route length as the route length is shorter, and higher priority is set to the optical frequency slot utilization rate as the optical frequency slot utilization rate is lower.

Figure 6:
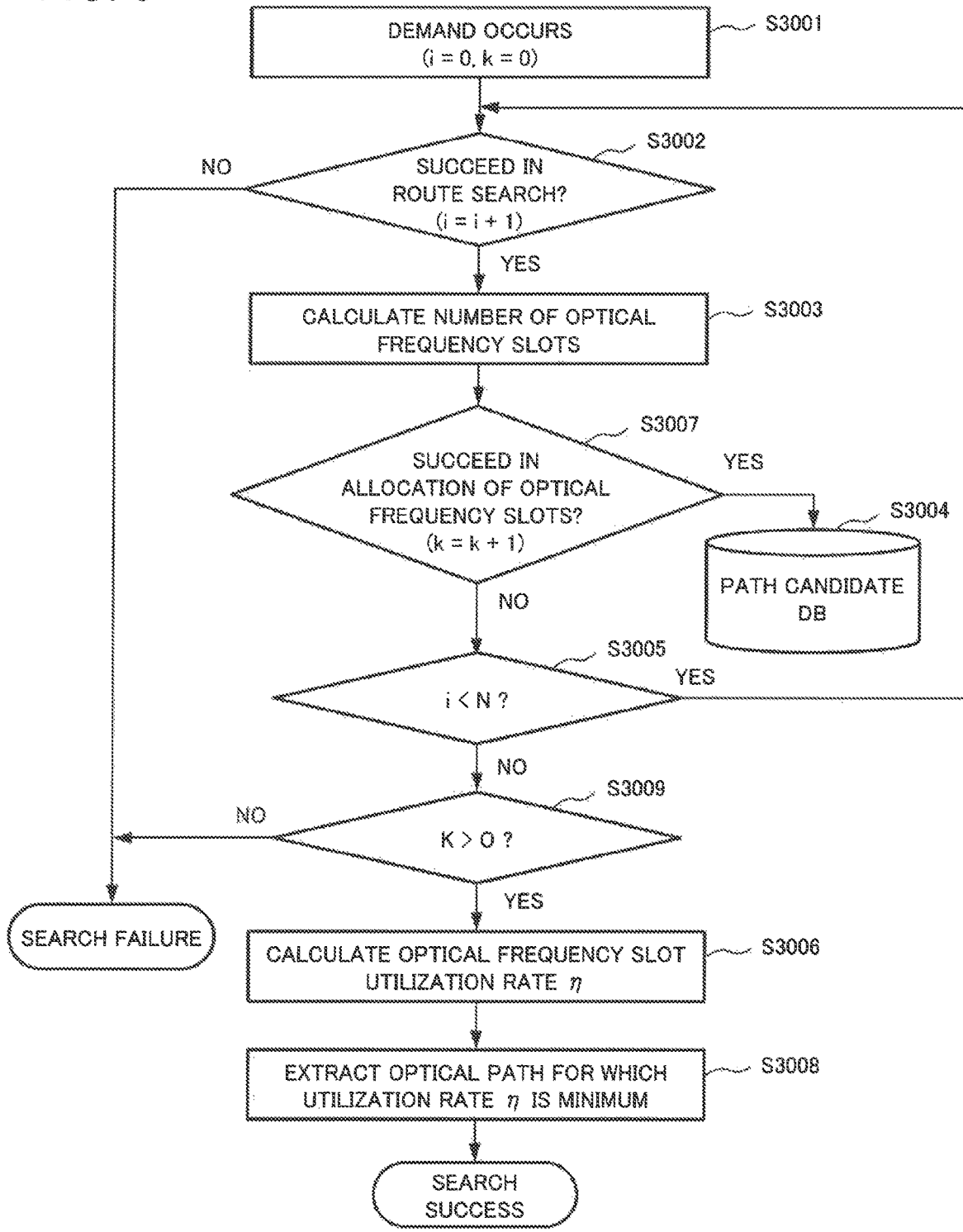
FIG. 6 is a flowchart to explain the operations of the optical path design apparatus according to the first example embodiment of the present invention.

FIG. 6 is a flowchart to explain the operations of the optical path design apparatus 100 according to the present example embodiment.

When a demand occurs (Step S3001), first, a route search for an optical path accommodating the demand is performed (Step S3002). When the route search results in failure (Step S3002/NO), a desired optical path cannot be opened.

When the route search results in success (Step S3002/YES), the number of optical frequency slots required to open an optical path using the route is calculated (Step S3003). After the number of required optical frequency slots is determined, the optical frequency slots are allocated to respective optical fibers on the searched route (Step S3007). When there are unallocated optical frequency slots of which number is equal to or more than the number of optical frequency slots determined in Step S3003 in all the optical fibers on the route, the allocation results in success (Step S3007/YES).

When the allocation results in failure because there is a shortage of the unallocated optical frequency slots in the optical fiber (Step S3007/NO), and the number of allocation failure times is lower than a predetermined maximum number of times N of the route search, the route search is redone (Step S3005/YES). However, in this case, the search is performed excepting routes for which the allocation of the optical frequency slots results in failure. When the allocation of the optical frequency slots does not result in success by the number of redoing times that is lower than the maximum number of times N of the route search, the optical path search is regarded as a failure.

When the allocation of the optical frequency slots results in success (Step S3007/YES), the result is stored as an optical path candidate in the path candidate database (DB) together with the optical frequency slot utilization situations of the respective optical fibers (Step S3004).

The sequence of operations mentioned above are repeated until the number of times exceeds the maximum number of times N of the route search.

When the number k of path candidates stored in the path candidate database is equal to zero (Step S3009/NO), the optical path search is regarded as a failure.

When the number k of the path candidates is larger than zero (Step S3009/YES), there is at least one optical path that can accommodate the demand having occurred in Step S3001. When there are a plurality of optical path candidates, an optical frequency slot utilization rate η is calculated for each of the plurality of optical path candidates (Step S3006). Then an optical path for which the optical frequency slot utilization rate η becomes minimum is extracted from the optical path candidates (Step S3008), and the extracted optical path is determined to be an optical path that accommodates the demand occurred. These steps make the optical path search successful.

Taking for example the above-mentioned case where the demand from the optical node 1005 to the optical node 1010 newly occurs, the optical path design apparatus 100 first searches for a route ranging from the optical node 1005 to the optical node 1010 (Step S3002). In this case also, the shortest route is optical path 1103 as is the case with the related method.

Other routes, which are not the shortest route, ranging from the optical node 1005 to the optical node 1010 can also be detected. One of the other routes is an optical path 1104 with the number of hops equal to four. The optical path 1104 is a route ranging from the optical node 1005 to the optical node 1010, and is a shortest route among routes with the number of hops larger than two. The number of optical frequency slots required to open the optical path 1104 is calculated to be two from FIG. 3 (Step S3003). Because there is more than one unallocated optical frequency slot in the optical fiber 1307 as illustrated in FIG. 4, the optical path 1104 is made a success in allocating the optical frequency slots (Step S3007).

An optical path with the shortest route length next to the optical path 1104 is an optical path 1105 (see FIG. 2). Because the number of hops in the optical path 1105 is six, the number of required optical frequency slots is calculated to be 10 from FIG. 3 (Step S3003). As mentioned above, it is assumed that each of the optical fibers 1201 to 1212 and 1301 to 1312 has communication resources that can accommodate up to six optical frequency slots. Accordingly, the shortage of the communication resources makes it impossible to open an optical path with regard to the optical path 1105 that requires ten optical frequency slots (Step S3007/NO).

Figure 7:
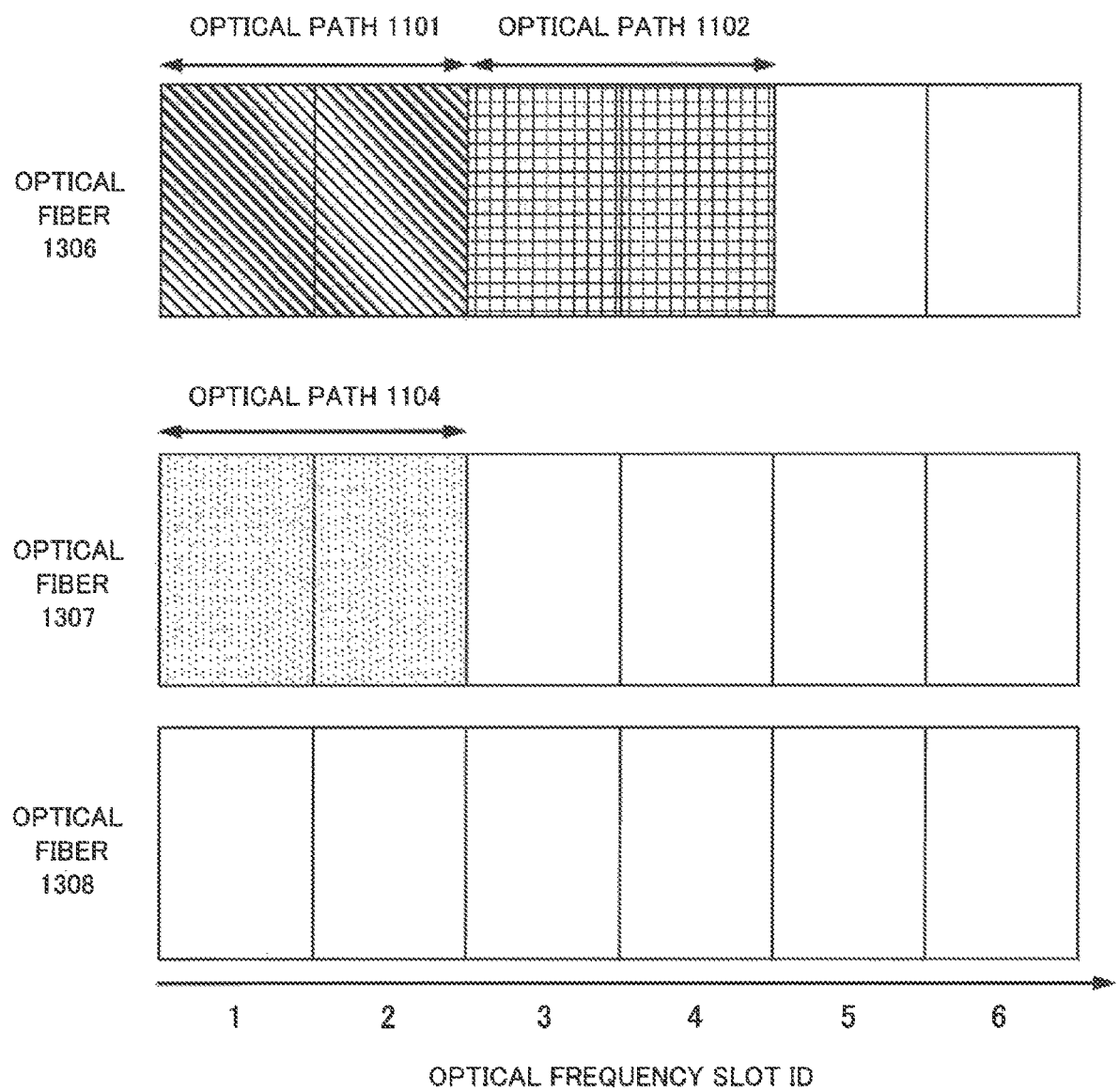
FIG. 7 is a diagram illustrating utilization situations of the optical frequency slots when the optical path design apparatus according to the first example embodiment of the present invention sets a new optical path.

FIG. 7 illustrates utilization situations of the optical frequency slots when the optical path design apparatus 100 according to the present example embodiment sets the optical path 1104.

The optical path design apparatus 100 stores the optical path 1104 in the path candidate database together with the optical frequency slot utilization situation illustrated in FIG. 7 (Step S3004). A similar procedure is also performed for path candidates other than the optical path 1104, and the path candidate database is updated. The above-described operations are repeated until the number of times exceeds the predetermined maximum number of times N of the route search. Because the optical path 1103 of a search result of the optical path according to the related method can also be one of the path candidates; accordingly, the optical path 1103 is also stored in the path candidate data. Consequently, there is at least one optical path candidate stored in the path candidate database; therefore, it is ensured that the path search does not result in failure (Step S3009/YES).

Figure 5:
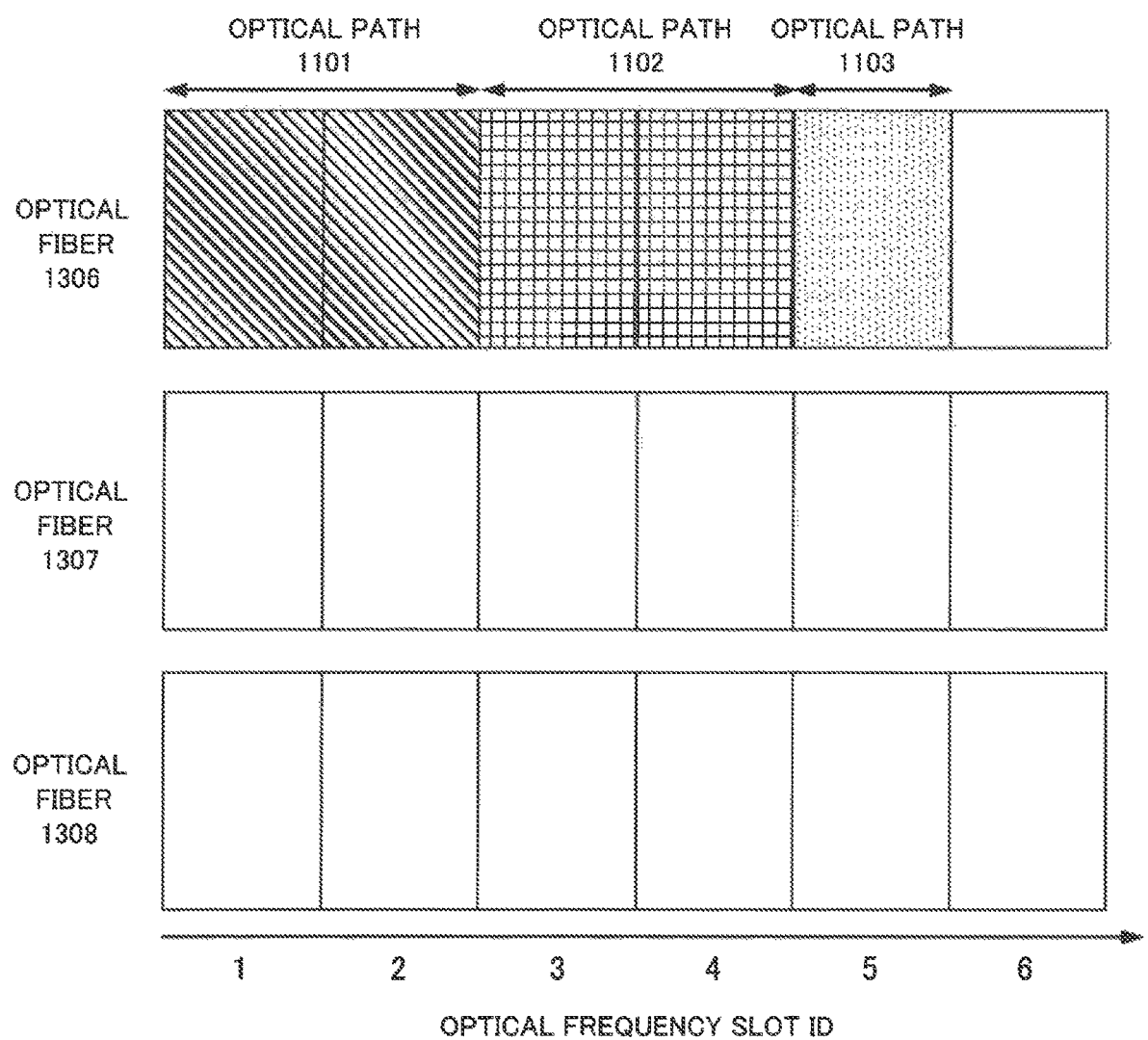
FIG. 5 is a diagram illustrating utilization situations of the optical frequency slots in the optical fibers when an optical path to accommodate a new demand is searched based on a related method.

With regard to the utilization situations of the optical frequency slots in the optical fibers on the route, the utilization situation for the optical path 1103 is illustrated in FIG. 5, and the utilization situation for the optical path 1104 is illustrated in FIG. 7. It can be seen from FIG. 5 and FIG. 7 that it is the optical fiber 1306 that the optical frequency slot utilization rate becomes maximum for both of the optical path 1103 and the optical path 1104. The optical frequency slot utilization rate η in the optical fiber 1306 is calculated as follows: η=5/6 with regard to the optical path 1103, and η=4/6 with regard to optical path 1104 (Step S3006). With regard to path candidates other than the optical paths 1103 and 1104, the optical frequency slot utilization rate is calculated in a similar way. As a result, the optical path 1104 is extracted as an optical path for which the optical frequency slot utilization rate η in the optical fiber 1306 becomes minimum (Step S3008). This makes only one optical path selected from among the plurality of path candidates, which leads to a success in the optical path search.

Focusing attention on the number of unallocated optical frequency slots in the optical fiber 1306, the number is one according to the related method as can be seen from FIG. 5, whereas the number is two according to the present example embodiment as can be seen from FIG. 7. That is to say, the present example embodiment makes it possible to increase the number of unallocated optical frequency slots in the optical fiber 1306 more than one obtained by the related method.

Here, another example will be considered in which the other new demand occurs and the need arises to allocate two more optical frequency slots to the optical fiber 1306. According to the related method with the utilization situation of the optical frequency slots illustrated in FIG. 5, a lack of the optical frequency slots makes it impossible to open an optical path to accommodate the demand. In contrast, according to the present example embodiment with the utilization situation of the optical frequency slots illustrated in FIG. 7, it is possible to open an optical path to accommodate the demand because of no lack of the optical frequency slots.

As described above, according to the optical path design apparatus 100 of the present example embodiment, it becomes possible to prevent the allocated optical frequency slots from locally concentrating on a specific optical fiber. As a result, it is possible to improve a success rate in opening an optical path compared to one according to the related method under the condition that the communication resources are constant.

Figure 8:
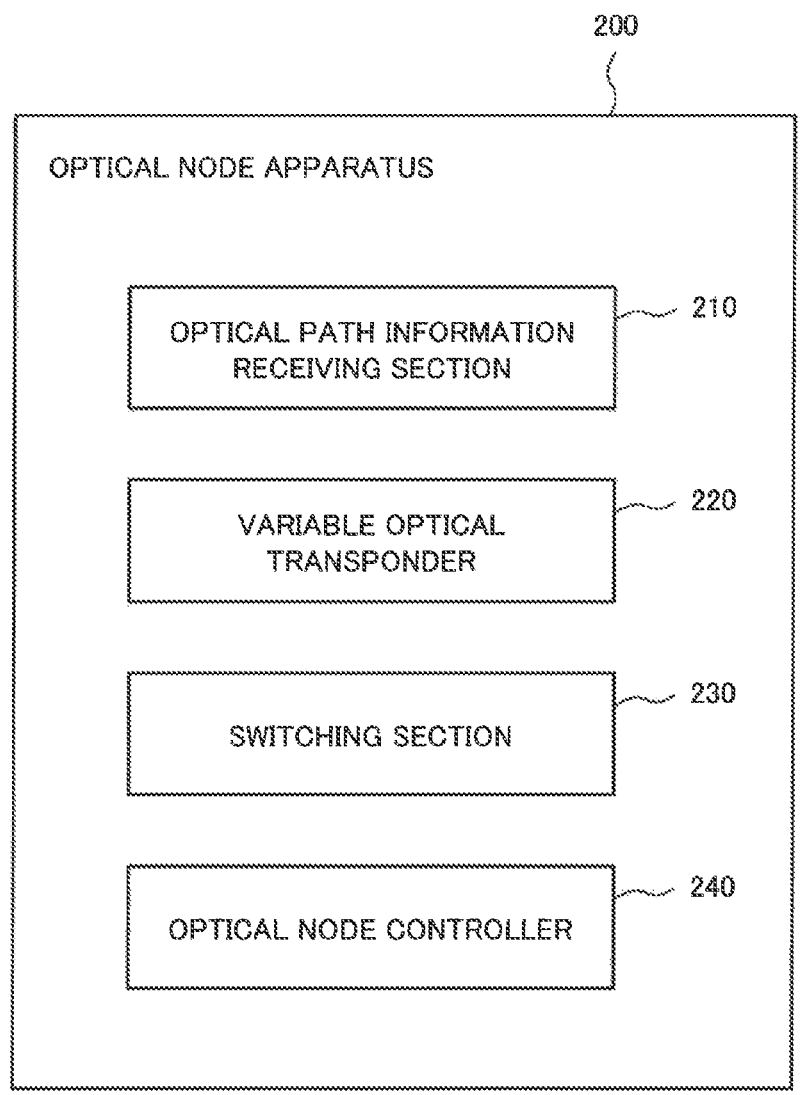
FIG. 8 is a block diagram illustrating a configuration of an optical node apparatus according to the first example embodiment of the present invention.

Next, an optical node apparatus will be described that is used in each of the optical nodes 1001 to 1016 constituting the optical communication network 1000. FIG. 8 illustrates a configuration of an optical node apparatus 200 according to the present example embodiment.

The optical node apparatus 200 includes: an optical path information receiving section (optical path information receiving means) 210, a variable optical transponder 220, a switching section (switching means) 230, and an optical node controller (optical node control means) 240.

The optical path information receiving section 210 receives route information and optical frequency band information concerning an optical path that accommodates a communication demand and that is determined by the optical path design apparatus 100. The variable optical transponder 220 generates signal light by modulating an optical carrier wave based on a client signal included in the communication demand. The variable optical transponder 220 is configured to vary a center frequency and an optical frequency bandwidth of the signal light. The switching section 230 is connected to one end of an optical fiber and changes an input/output route by the optical path. The optical node controller 240 controls the switching section 230 based on the route information and controls the variable optical transponder 220 based on the optical frequency band information.

Next, an optical path design method according to the present example embodiment will be described.

In the optical path design method according to the present example embodiment, first, a route of an optical path to accommodate a communication demand is searched for, and a plurality of route candidates are selected. A plurality of optical path candidates are selected by allocating an optical frequency band required to accommodate the optical path to each of optical fibers on the plurality of route candidates. Then the optical path to accommodate the communication demand is determined from among the plurality of optical path candidates based on an optical frequency band utilization rate in the optical fiber.

The determining of the optical path can include determining, as the optical path to accommodate the communication demand, the optical path candidate with minimum optical frequency band utilization rate in a maximum accommodation optical fiber in which the optical frequency band utilization rate is maximum among the optical fibers.

The above-mentioned each step may be performed by a computer. That is to say, it is possible to use a program that allows a computer to function as a route candidate selection means, an optical path candidate selection means, and an optical path determination means.

The route candidate selection means is to search for a route of an optical path to accommodate a communication demand, and select a plurality of route candidates. The optical path candidate selection means is to select a plurality of optical path candidates by allocating an optical frequency band required to accommodate the optical path to each of optical fibers on the plurality of route candidates. The optical path determination means is to determine the optical path from among the plurality of optical path candidates based on an optical frequency band utilization rate in the optical fiber.

As described above, according to the optical path design apparatus 100, the optical node apparatus 200, the optical path design method, and the program of the present example embodiment, it becomes possible, in an optical communication network using a wavelength division multiplexing system, to increase the accommodation efficiency for optical paths. As a result, it becomes possible to use the optical communication network efficiently.

Second Example Embodiment

Next, a second example embodiment of the present invention will be described. The configuration of an optical path design apparatus according to the present example embodiment is similar to that according to the first example embodiment (see FIG. 1).

In the optical path design apparatus according to the present example embodiment, the optical path determination section 130 selects, among optical fibers on a plurality of route candidates, an additional optical path that uses a band-unused optical fiber with an optical frequency band utilization rate being less than one. The optical path determination section 130 is configured to determine the addition of an additional optical fiber to accommodate the additional optical path and determine the additional optical path as an optical path to accommodate a communication demand.

That is to say, when the search for the optical path results in failure due to insufficient communication resources in the optical communication network 1000, the optical path design apparatus is configured to avoid the failure in the optical path search by adding required communication resources and calculate communication resources required to accommodate all desired demands.

Figure 9:
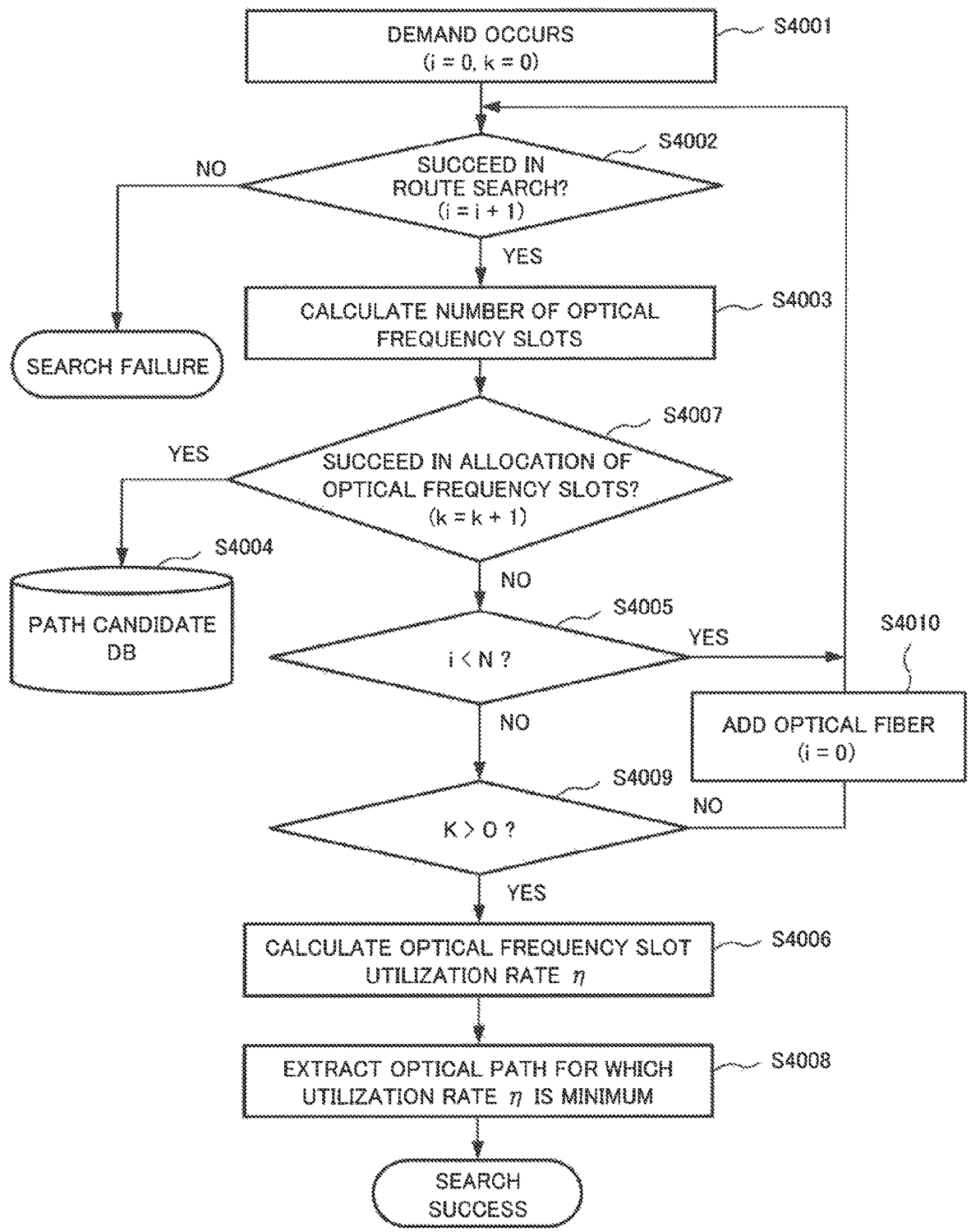
FIG. 9 is a flowchart to explain the operations of an optical path design apparatus according to a second example embodiment of the present invention.

Next, the operation of the optical path design apparatus according to the present example embodiment will be described more in detail using FIG. 9. FIG. 9 is a flowchart to explain the operation of the optical path design apparatus according to the present example embodiment.

As illustrated in FIG. 9, the operation of the optical path design apparatus according to the present example embodiment differs from the operation of the optical path design apparatus according to the first example embodiment (see FIG. 6) in that a step for adding an optical fiber (Step S4010) is added. The other basic operations are similar to the operations of the optical path design apparatus according to the first example embodiment; accordingly, a different operation will be described below in detail.

Figure 10:
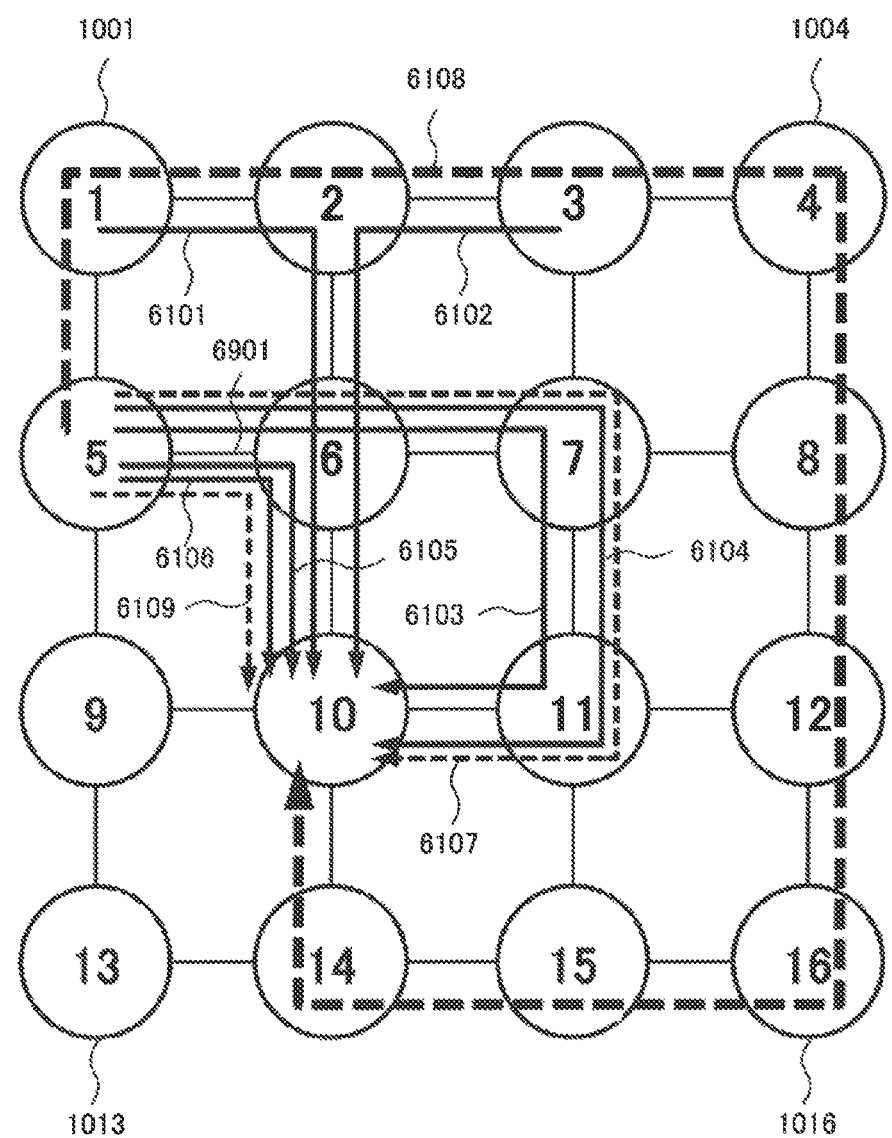
FIG. 10 is a diagram illustrating search situations for optical paths, for explaining the operations of the optical path design apparatus according to the second example embodiment of the present invention.
Figure 11:
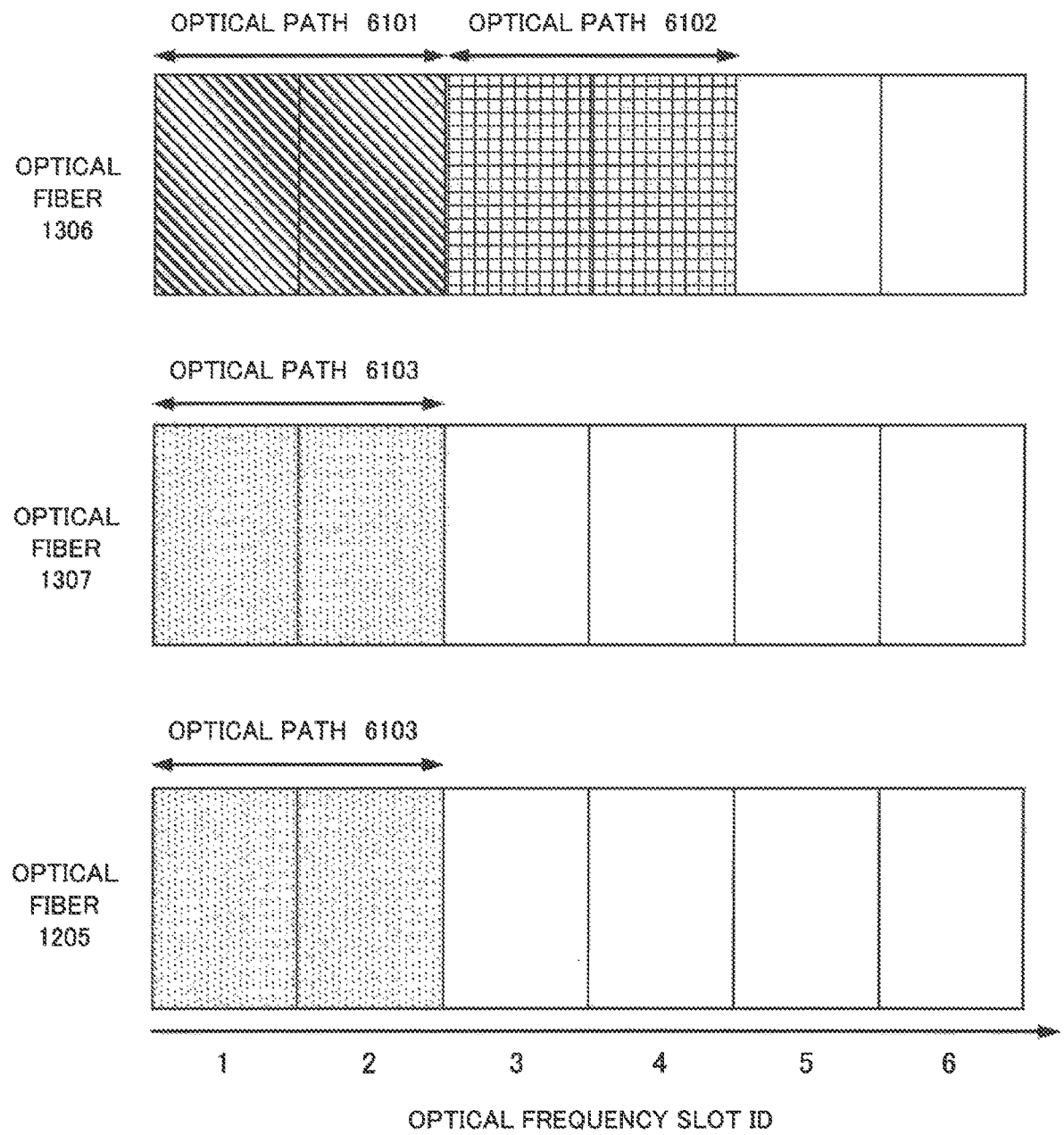
FIG. 11 is a diagram illustrating utilization situations of optical frequency slots in optical fibers corresponding to a new optical path that is searched for by the optical path design apparatus according to the second example embodiment of the present invention.
Figure 12:
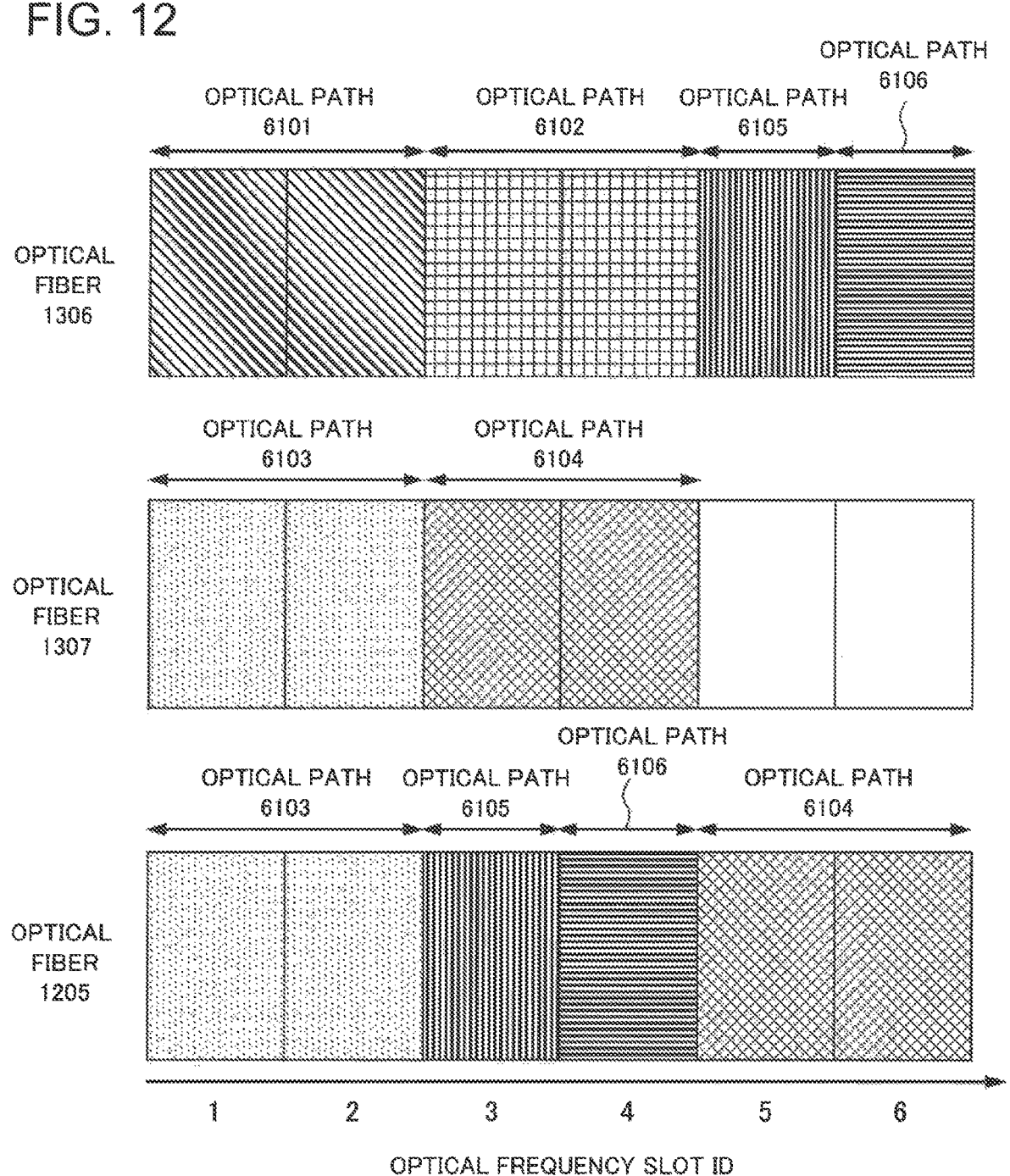
FIG. 12 is a diagram illustrating utilization situations of the optical frequency slots in the optical fibers corresponding to the new optical path that is searched for by the optical path design apparatus according to the second example embodiment of the present invention.

FIG. 10 illustrates search situations for optical paths, where an optical path 6101 and an optical path 6102 are set in advance as the initial state, and the demand from the optical node 1005 to the optical node 1010 increases. FIG. 10 illustrates an example in which optical paths 6103 to 6109 are searched for as additional optical paths. FIG. 11 and FIG. 12 illustrate the utilization situations of the optical frequency slots in the optical fiber 1306, the optical fiber 1307, and the optical fiber 1205, which correspond to the optical paths in this case.

Starting from the initial state in which the optical path 6101 and the optical path 6102 are set, optical paths to accommodate increasing demands are added in accordance with the operation of the optical path design apparatus of the present example embodiment illustrated in FIG. 9.

First, it is an optical path 6103 that is an optical path to be set when the demands are increased by one only. As illustrated in FIG. 10, the optical path 6103 starts from the optical node 1005, passes through the optical fiber 1205 and the optical fiber 1307, and is connected to the optical node 1010. The operation for setting the optical path 6103 is as described in detail in the first example embodiment.

FIG. 11 illustrates the utilization situations of the optical frequency slots at this time. Because the optical path 6103 is an optical path having four hops, the number of required optical frequency slots is two according to FIG. 3. Consequently, two optical frequency slots are allocated to each of the optical fibers 1205 and 1307 for the optical path 6103.

When the demands are further increased, the optical paths 6104 to 6106 are set in accordance with the operation of the optical path design apparatus according to the present example embodiment illustrated in FIG. 9. As a result, the utilization situations of the optical frequency slots changes from the state illustrated in FIG. 11 to the state illustrated in FIG. 12.

An example will be examined in which the demands are still further increased. As can be seen from the utilization situations of the optical frequency slots illustrated in FIG. 12, there is no unused optical frequency slot in the optical fiber 1205 and the optical fiber 1306. Accordingly, these optical fibers cannot be used. As a result, an optical path 6108 bypassing these optical fibers becomes a next candidate. However, because the number of hops in the optical path 6108 is larger than six, the optical path 6108 cannot be connected due to the restrictions on the reachability of the optical signal illustrated in FIG. 3. Similar results are also obtained for other optical path candidates; consequently, it is determined that there is no connectable optical path whatever the predetermined maximum number of times N of the route search may be (Step S4009/NO in FIG. 9). Accordingly, the optical path design apparatus according to the present example embodiment determines that an optical fiber is added (Step S4010).

In adding an optical fiber (Step S4010), the optical fiber is added so that the number of additional optical fibers may become minimum. It can be seen from FIG. 12 that the optical fiber 1307 is an optical fiber in which there is an unused optical frequency slot, that is, a band-unused optical fiber with the optical frequency band utilization rate being less than one. Consequently, it takes priority to add an optical fiber prepared for an optical path utilizing the optical fiber 1307. When the optical fiber 1307 is used, it is optical path 6107 that can be opened. Because the optical path 6107 also passes through the optical fiber 1205, the optical path 6107 can be opened by adding one optical fiber of optical fiber 6901 that connects the optical node 1105 and the optical node 1106 as with the optical fiber 1205. Accordingly, after determining the addition of the optical fiber 6901 (Step S4010), the optical path design apparatus according to the present example embodiment performs the route search once again (Step S4002).

As described above, the addition of the optical fiber 6901 makes it possible to open the optical path 6107 that has been unopenable due to the shortage of the optical frequency slots. As a result, it is possible to avoid the failure in the optical path search.

In the above-mentioned example, as illustrated in FIG. 10, one optical fiber is disposed between respective optical nodes in the initial state; accordingly, the total number of the optical fibers is 24. From the initial state, one optical fiber of optical fiber 6901 is newly set up between the optical node 1005 and the optical node 1006, which makes it possible to further open the optical path 6107.

The optical path design apparatus may be configured to hold the addition of one optical fiber of optical fiber 6901 as the route information in adding the optical fiber (Step S4010). This makes it possible to know the number and the layout of the optical fibers required to accommodate all desired demands.

As described above, according to the optical path design apparatus and the optical path design method of the present example embodiment, as is the case with the first example embodiment, it becomes possible, in an optical communication network using a wavelength division multiplexing system, to increase the accommodation efficiency for optical paths. As a result, it becomes possible to use the optical communication network efficiently.

Third Example Embodiment

Figure 13:
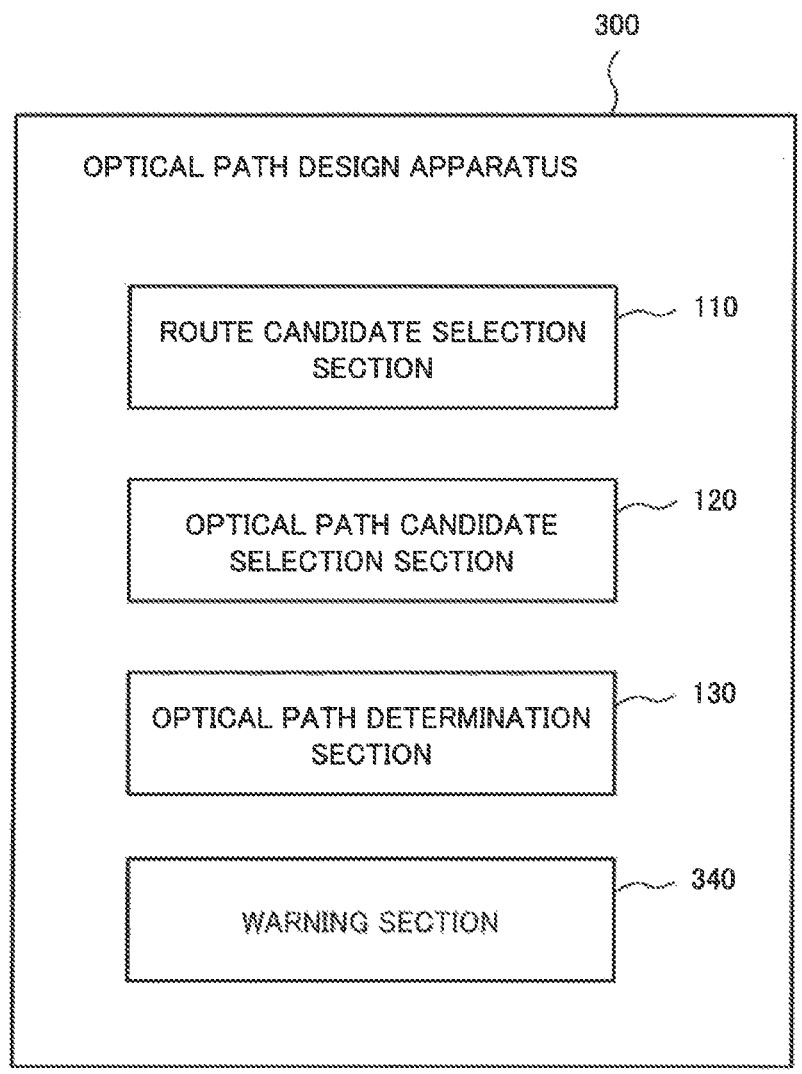
FIG. 13 is a block diagram illustrating a configuration of an optical path design apparatus according to a third example embodiment of the present invention.

Next, a third example embodiment of the present invention will be described. FIG. 13 illustrates a configuration of an optical path design apparatus 300 according to the present example embodiment.

The optical path design apparatus 300 includes the route candidate selection section (route candidate selection means) 110, the optical path candidate selection section (optical path candidate selection means) 120, and the optical path determination section (optical path determination means) 130. The optical path design apparatus 300 differs from the optical path design apparatus 100 according to the first example embodiment in that a warning section (warning means) 340 is further included. The warning section 340 calculates an optical frequency band utilization rate in an optical fiber and generates warning information when the calculated optical frequency band utilization rate exceeds a predetermined threshold value. The other configurations are similar to the configurations of the optical path design apparatus 100 according to the first example embodiment; accordingly, those descriptions will not be repeated.

Figure 14:
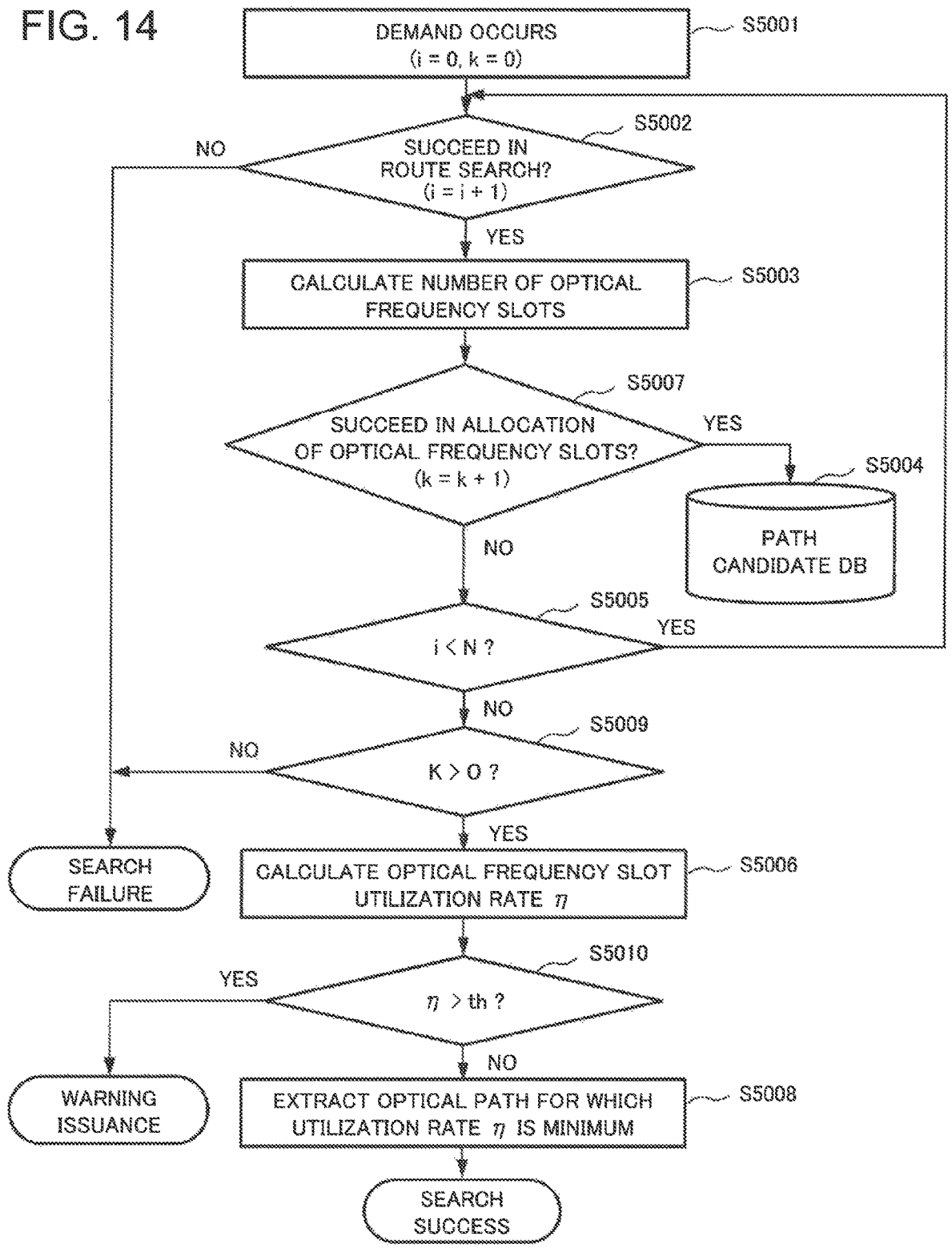
FIG. 14 is a flowchart to explain the operations of the optical path design apparatus according to the third example embodiment of the present invention.

Next, the operation of the optical path design apparatus 300 according to the present example embodiment will be described. FIG. 14 illustrates a flowchart to explain the operations of the optical path design apparatus 300 according to the present example embodiment.

The optical path design apparatus 300 according to the present example embodiment generates warning information when the optical frequency slot utilization rate in the optical fiber exceeds a predetermined threshold value th in the optical communication network 1000. Then the optical path design apparatus 300 issues a warning to a network management system and the like. The other basic operations are similar to the operations of the optical path design apparatus according to the first example embodiment; accordingly, a different operation will be described below in detail. When the utilization situations of the optical frequency slots in the optical fibers changes to the states illustrated in FIG. 12, there is no unallocated optical frequency slot in the optical fiber 1306 and the optical fiber 1205. There is no route that does not pass through the optical node 1009, does not use the optical fiber 1306 and the optical fiber 1205, and can connect the optical node 1005 and the optical node 1010 within six hops. This makes it impossible due to insufficient communication resources, even if a demand from the optical node 1005 to the optical node 1010 newly occurs, to generate a new optical path to accommodate the demand. In order to avoid the above, it is only necessary to add the communication resources such as an optical fiber. However, it takes time to provide additional communication resources. The optical path design apparatus 300 according to the present example embodiment is configured to anticipate in advance a shortage of the communication resources in the future and to prevent it from arising that insufficient communication resources make it impossible to generate an optical path.

In calculating the optical frequency slot utilization rate η (Step S5006 in FIG. 14), the optical path design apparatus 300 according to the present example embodiment understands the utilization situations of the optical frequency slots in the respective optical fibers that constitute the optical communication network 1000. When the utilization rate of the optical frequency slots exceeds the predetermined threshold value th (Step S5010/YES), the optical path design apparatus 300 issues, to a network management system that manages the entire network, a warning to the effect that the communication resources are running short, for example. Receiving the warning enables the network management system to additionally provide the optical fiber for the right place at the right time. This makes it possible to avoid the situation that it becomes impossible to generate an optical path due to insufficient communication resources.

In addition, according to the optical path design apparatus 300 and the optical path design method of the present example embodiment, as is the case with the first example embodiment, it becomes possible, in an optical communication network using a wavelength division multiplexing system, to increase the accommodation efficiency for optical paths. As a result, it becomes possible to use the optical communication network efficiently.

The whole or part of the example embodiments disclosed above can be described as, but not limited to, the following supplementary notes.

(Supplementary note 1) An optical path design apparatus, comprising: route candidate selection means for searching for a route of an optical path to accommodate a communication demand and selecting a plurality of route candidates; optical path candidate selection means for selecting a plurality of optical path candidates by allocating an optical frequency band required to accommodate the optical path to each of optical fibers on the plurality of route candidates; and optical path determination means for determining the optical path from among the plurality of optical path candidates based on an optical frequency band utilization rate in the optical fibers.

(Supplementary note 2) The optical path design apparatus according to Supplementary note 1, wherein the route candidate selection means selects the plurality of route candidates based on optical transmission performance using the optical fibers.

(Supplementary note 3) The optical path design apparatus according to Supplementary note 1 or 2, wherein the optical path determination means determines, as the optical path, the optical path candidate with minimum optical frequency band utilization rate in a maximum accommodation optical fiber in which the optical frequency band utilization rate is maximum among the optical fibers.

(Supplementary note 4) The optical path design apparatus according to any one of Supplementary notes 1, 2, and 3, wherein the optical path determination means selects, among the optical fibers, an additional optical path using a band-unused optical fiber with the optical frequency band utilization rate being less than one, determines addition of an additional optical fiber to accommodate the additional optical path, and determines the additional optical path as the optical path.

(Supplementary note 5) The optical path design apparatus according to any one of Supplementary notes 1, 2, 3, and 4, further comprising warning means for calculating the optical frequency band utilization rate in the optical fibers and generating warning information when the optical frequency band utilization rate having been calculated exceeds a predetermined threshold value.

(Supplementary note 6) An optical node apparatus, comprising: optical path information receiving means for receiving route information and optical frequency band information concerning the optical path determined by the optical path design apparatus according to any one of Supplementary notes 1, 2, 3, 4, and 5; a variable optical transponder configured to generate signal light by modulating an optical carrier wave based on a client signal included in the communication demand, and vary a center frequency and an optical frequency band width of the signal light; switching means for changing at least one of an input route and an output route by the optical path, the switching means being connected to one end of the optical fibers; and optical node control means for controlling the switching means based on the route information, and controlling the variable optical transponder based on the optical frequency band information.

(Supplementary note 7) An optical path design method, comprising: searching for a route of an optical path to accommodate a communication demand and selecting a plurality of route candidates; selecting a plurality of optical path candidates by allocating an optical frequency band required to accommodate the optical path to each of optical fibers on the plurality of route candidates; and determining the optical path from among the plurality of optical path candidates based on an optical frequency band utilization rate in the optical fibers.

(Supplementary note 8) The optical path design method according to Supplementary note 7, wherein the determining of the optical path includes determining, as the optical path, the optical path candidate with minimum optical frequency band utilization rate in a maximum accommodation optical fiber in which the optical frequency band utilization rate is maximum among the optical fibers.

(Supplementary note 9) The optical path design method according to Supplementary note 7 or 8, wherein the determining of the optical path includes selecting, among the optical fibers, an additional optical path using a band-unused optical fiber with the optical frequency band utilization rate being less than one, determining addition of an additional optical fiber to accommodate the additional optical path, and determining the additional optical path as the optical path.

(Supplementary note 10) The optical path design method according to any one of Supplementary notes 7, 8, and 9, further comprising calculating the optical frequency band utilization rate in the optical fibers and generating warning information when the optical frequency band utilization rate having been calculated exceeds a predetermined threshold value.

(Supplementary note 11) The optical path design apparatus according to any one of Supplementary notes 1, 2, 3, 4, and 5, wherein the optical frequency band utilization rate is calculated by using at least one of number of optical frequency slots, number of optical paths, and number of optical frequency slots that are continuously arranged.

(Supplementary note 12) The optical path design apparatus according to Supplementary note 2, wherein the optical transmission performance includes at least one of an optical signal-to-noise ratio, a nonlinear effect of an optical fiber, a crosstalk between adjacent wavelength channels, and a passband narrowing effect due to an optical band pass filter.

(Supplementary note 13) The optical path design method according to any one of Supplementary notes 7, 8, 9, and 10, wherein the selecting of the plurality of route candidates includes selecting the plurality of route candidates based on optical transmission performance using the optical fibers.

(Supplementary note 14) The optical path design method according to Supplementary note 13, wherein the optical transmission performance includes at least one of an optical signal-to-noise ratio, a nonlinear effect of an optical fiber, a crosstalk between adjacent wavelength channels, and a passband narrowing effect due to an optical band pass filter.

(Supplementary note 15) The optical path design method according to any one of Supplementary notes 7, 8, 9, 10, 13, and 14, wherein the optical frequency band utilization rate is calculated by using at least one of number of optical frequency slots, number of optical paths, and number of optical frequency slots that are continuously arranged.

(Supplementary note 16) A computer-readable recording medium recording a program for making a computer function as route candidate selection means for searching for a route of an optical path to accommodate a communication demand and selecting a plurality of route candidates; optical path candidate selection means for selecting a plurality of optical path candidates by allocating an optical frequency band required to accommodate the optical path to each of optical fibers on the plurality of route candidates; and optical path determination means for determining the optical path from among the plurality of optical path candidates based on an optical frequency band utilization rate in the optical fibers.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 100, 300 Optical path design apparatus
110 Route candidate selection section
120 Optical path candidate selection section
130 Optical path determination section
200 Optical node apparatus
210 Optical path information receiving section
220 Variable optical transponder
230 Switching section
240 Optical node controller
340 Warning section
1000 Optical communication network
1001 to 1016 Optical node
1101 to 1105, 6101 to 6109 Optical path
1201 to 1212, 1301 to 1312, 6901 Optical fiber

The invention claimed is:

1. An optical path design apparatus, comprising:
a route candidate selection section configured to search for a route of an optical path to accommodate a communication demand and to select a plurality of route candidates;
an optical path candidate selection section configured to select a plurality of optical path candidates by allocating an optical frequency band required to accommodate the optical path to each of optical fibers on the plurality of route candidates; and
an optical path determination section configured to determine the optical path from among the plurality of optical path candidates based on an optical frequency band utilization rate in the optical fibers,
wherein the optical path determination section determines, as the optical path, the optical path candidate with a minimum optical frequency band utilization rate in a maximum accommodation optical fiber in which the optical frequency band utilization rate is a maximum among the optical fibers on the plurality of route candidates.

2. The optical path design apparatus according to claim 1, wherein
the route candidate selection section selects the plurality of route candidates based on optical transmission performance using the optical fibers.

3. The optical path design apparatus according to claim 2, wherein
the optical path determination section selects, among the optical fibers, an additional optical path using an optical fiber with the optical frequency band utilization rate being less than a predetermined value, determines an additional optical fiber to accommodate the additional optical path, and determines the additional optical path as the optical path.

4. The optical path design apparatus according to claim 2, wherein
the optical transmission performance includes at least one of an optical signal-to-noise ratio, a nonlinear effect of an optical fiber, a crosstalk between adjacent wavelength channels, and a passband narrowing effect due to an optical band pass filter.

5. The optical path design apparatus according to claim 1, wherein
the optical path determination section selects, among the optical fibers, an additional optical path using an optical fiber with the optical frequency band utilization rate being less than a predetermined value, determines an additional optical fiber to accommodate the additional optical path, and determines the additional optical path as the optical path.

6. The optical path design apparatus according to claim 1, further comprising
a warning section configured to calculate, before determining the optical path, the optical frequency band utilization rate in the optical fibers and generate warning information when the optical frequency band utilization rate having been calculated exceeds a predetermined threshold value.

7. The optical path design apparatus according to claim 1, wherein
the optical frequency band utilization rate is calculated by using at least one of number of optical frequency slots, number of optical paths, and number of optical frequency slots that are continuously arranged.

8. An optical path design method, comprising:
searching for a route of an optical path to accommodate a communication demand and selecting a plurality of route candidates;
selecting a plurality of optical path candidates by allocating an optical frequency band required to accommodate the optical path to each of optical fibers on the plurality of route candidates; and
determining the optical path from among the plurality of optical path candidates based on an optical frequency band utilization rate in the optical fibers,
wherein the determining of the optical path includes determining, as the optical path, the optical path candidate with a minimum optical frequency band utilization rate in a maximum accommodation optical fiber in which the optical frequency band utilization rate is a maximum among the optical fibers on the plurality of route candidates.

9. The optical path design method according to claim 8, wherein
the determining of the optical path includes selecting, among the optical fibers, an additional optical path using an optical fiber with the optical frequency band utilization rate being less than a predetermined value, determining an additional optical fiber to accommodate the additional optical path, and determining the additional optical path as the optical path.

10. The optical path design method according to claim 8, wherein
the selecting of the plurality of route candidates includes selecting the plurality of route candidates based on optical transmission performance using the optical fibers.

11. The optical path design method according to claim 10, wherein
the optical transmission performance includes at least one of an optical signal-to-noise ratio, a nonlinear effect of an optical fiber, a crosstalk between adjacent wavelength channels, and a passband narrowing effect due to an optical band pass filter.

12. The optical path design method according to claim 8, wherein
the optical frequency band utilization rate is calculated by using at least one of number of optical frequency slots, number of optical paths, and number of optical frequency slots that are continuously arranged.

13. An optical path design method, comprising:
searching for a route of an optical path to accommodate a communication demand and selecting a plurality of route candidates;
selecting a plurality of optical path candidates by allocating an optical frequency band required to accommodate the optical path to each of optical fibers on the plurality of route candidates;
determining the optical path from among the plurality of optical path candidates based on an optical frequency band utilization rate in the optical fibers; and
calculating, before determining the optical path, the optical frequency band utilization rate in the optical fibers and generating warning information when the optical frequency band utilization rate having been calculated exceeds a predetermined threshold value.

14. An optical path design apparatus, comprising:
a route candidate selection section configured to search for a route of an optical path to accommodate a communication demand and select a plurality of route candidates;
an optical path candidate selection section configured to select a plurality of optical path candidates by allocating an optical frequency band required to accommodate the optical path to each of optical fibers on the plurality of route candidates;
an optical path determination section configured to determine the optical path from among the plurality of optical path candidates based on an optical frequency band utilization rate in the optical fibers; and
a warning section configured to calculate, before determining the optical path, the optical frequency band utilization rate in the optical fibers and generate warning information when the optical frequency band utilization rate having been calculated exceeds a predetermined threshold value,
wherein the route candidate selection section selects the plurality of route candidates based on an optical transmission performance using the optical fibers.

* * * * *